(12) United States Patent
Boyce

(10) Patent No.: US 11,244,425 B2
(45) Date of Patent: *Feb. 8, 2022

(54) SPHERICAL ROTATION FOR ENCODING WIDE VIEW VIDEO

(71) Applicant: Intel Corporation, Santa Clara, CA (US)

(72) Inventor: Jill M. Boyce, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/033,374

(22) Filed: Sep. 25, 2020

(65) Prior Publication Data

US 2021/0012460 A1    Jan. 14, 2021

Related U.S. Application Data

(63) Continuation of application No. 16/341,392, filed as application No. PCT/US2017/061714 on Nov. 15, 2017, now Pat. No. 10,832,378.

(Continued)

(51) Int. Cl.
*G06T 3/60*            (2006.01)
*G06T 3/40*            (2006.01)

(Continued)

(52) U.S. Cl.
CPC ............ *G06T 3/4038* (2013.01); *G06F 3/012* (2013.01); *G06T 3/0087* (2013.01); *G06T 3/60* (2013.01);

(Continued)

(58) Field of Classification Search
CPC ..... G06T 3/4038; G06T 7/215; G06T 3/0087; G06T 3/60; G06T 2207/10016;

(Continued)

(56) References Cited

U.S. PATENT DOCUMENTS 4,704,728  A    11/1987  Scheiber
8,743,219  B1     6/2014  Bledsoe
(Continued)

FOREIGN PATENT DOCUMENTS

CN            1491403         4/2004
CN          101495965         7/2009
(Continued)

OTHER PUBLICATIONS

European Search Report for European Patent Application No. 17870859.0, dated Jun. 8, 2020.

(Continued)

*Primary Examiner* — John R Schnurr
(74) *Attorney, Agent, or Firm* — Hanley, Flight & Zimmerman LLC

(57) ABSTRACT

Spherical rotation is described for encoding a video that has a wide field of view, such as a spherical or hemispherical video. One example relates to receiving encoded video including rotation orientation metadata, decoding the video, extracting the rotation orientation metadata, rotating the decoded video based on the rotation orientation metadata, generating a view of the rotated decoded video, and buffering the generated view for display.

23 Claims, 9 Drawing Sheets

Related U.S. Application Data

(60) Provisional application No. 62/423,319, filed on Nov. 17, 2016.

(51) Int. Cl.
*H04N 19/70* (2014.01)
*G06T 7/215* (2017.01)
*G06F 3/01* (2006.01)
*G06T 3/00* (2006.01)
*H04N 5/232* (2006.01)

(52) U.S. Cl.
CPC ......... *G06T 7/215* (2017.01); *H04N 5/23238* (2013.01); *H04N 19/70* (2014.11); *G06T 2207/10016* (2013.01)

(58) Field of Classification Search
CPC ...... G06T 7/10; H04N 19/70; H04N 5/23238; H04N 13/363; H04N 13/393; H04N 13/398; H04N 13/161; H04N 13/111; G06F 3/012
See application file for complete search history.

(56) References Cited

U.S. PATENT DOCUMENTS

| | | | |
|---|---|---|---|
| 9,277,122 | B1 | 3/2016 | Imura et al. |
| 9,497,457 | B1 | 11/2016 | Gupta |
| 10,375,375 | B2 | 8/2019 | Hwang et al. |
| 10,560,660 | B2 | 2/2020 | Boyce |
| 2009/0110372 | A1 | 4/2009 | Morioka et al. |
| 2009/0129636 | A1 | 5/2009 | Mei et al. |
| 2010/0001997 | A1 | 1/2010 | Kajikawa et al. |
| 2012/0092348 | A1 | 4/2012 | Mccutchen |
| 2013/0176384 | A1 | 7/2013 | Jones et al. |
| 2015/0181233 | A1 | 6/2015 | Ramasubramonlan et al. |
| 2015/0249815 | A1 | 9/2015 | Sandrew et al. |
| 2016/0012855 | A1 | 1/2016 | Krishnan |
| 2016/0086379 | A1 | 3/2016 | Sadi et al. |
| 2016/0165309 | A1 | 6/2016 | Van Brandenburg et al. |
| 2016/0227255 | A1 | 8/2016 | Wang et al. |
| 2017/0026659 | A1 | 1/2017 | Lin et al. |
| 2018/0374192 | A1 | 12/2018 | Kunkel et al. |
| 2019/0251660 | A1* | 8/2019 | Lin ..................... H04N 13/117 |
| 2020/0014905 | A1 | 1/2020 | Oh |
| 2020/0014907 | A1 | 1/2020 | Lee et al. |
| 2020/0021791 | A1 | 1/2020 | Hur et al. |
| 2020/0084428 | A1 | 3/2020 | Oh et al. |

FOREIGN PATENT DOCUMENTS

| | | |
|---|---|---|
| CN | 102042830 | 5/2011 |
| CN | 103250114 | 8/2013 |
| CN | 103416002 | 11/2013 |
| CN | 104482948 | 4/2015 |
| CN | 104980697 | 10/2015 |
| CN | 105261257 | 1/2016 |
| CN | 106060515 | 10/2016 |
| EP | 2490179 | 8/2012 |
| WO | 2012121744 | 9/2012 |
| WO | 2016010668 | 1/2016 |

OTHER PUBLICATIONS

European Search Report for European Patent Application No. 17871202.2, dated May 8, 2020.
International Preliminary Report on Patentability for PCT Application No. PCT/US17/61731, dated May 31, 2019.
International Preliminary Report on Patentability for PCT/US17/61714, dated May 31, 2019.
International Search Report and Written Opinion for PCT Application No. PCT/US17/61714, dated Feb. 8, 2018.
International Search Report and Written Opinion for PCT Application No. PCT/US17/61731, dated Mar. 19, 2018.
Non-Final Office Action for U.S. Appl. No. 16/341,392, dated Mar. 24, 2020.
Non-Final Office Action for U.S. Appl. No. 16/341,394, dated Mar. 26, 2020.
Notice of Allowance for U.S. Appl. No. 16/341,394, dated Aug. 28, 2020.
Notice of Allowance for U.S. Appl. No. 16/341,392, dated Jul. 13, 2020.
Boyce, J. et al., "SEI message for display orientation information", JCT-VC Meeting; retrieved from the Internet at http://phenix.int-evry.fr/jct/doc_end_user/documents/7_Geneva/wg11/JCTVC-G079-v2.zip Nov. 24, 2011.
Hanhart, P. et al., "AHG8: High level syntax 10, 11 extensions for signaling of 360 degree vidoe information", JVET Meeting; Oct. 6, 2016.
Thomas, E. et al., "Projection-independent ROI signalling for spherical content (OMAF)", Motion Picture Expert Group (MPEG) Meeting, Chengdu, Oct. 12, 2016.
The State Intellectual Property Office of People's Republic of China, "First Office Action and Search Report," issued in connection with application No. 201780067678.3, dated Nov. 2, 2020, 20 pages. (English translation provided).
European Patent Office, "Extended European Search Report," issued in connection with application No. 20217257.3, dated Apr. 13, 2021, 10 pages.
European Patent Office, "Extended European Search Report," issued in connection with application No. 201217262.3, dated Apr. 13, 2021, 10 pages.
National Intellectual Property Administration of China, "Notice of Registration," issued in connection with application No. 201780067678.3, dated Apr. 2, 2021, 7 pages. (English translation provided).
Chinese Patent Application No. 202011566231.0 "Report" (in English), Beijing East IP Ltd., dated Dec. 2, 2021, of "First Office Action" (in Chinese), Chinese Patent Office, dated Dec. 1, 2021, 8 pages.
Chinese Patent Application No. 202011568062.4, "Report" (in English) Beijing East IP Ltd., dated Dec. 2, 2021, of "First Office Action" (in Chinese), Chinese Patent Office, dated Dec. 1, 2021, 8 pages.
Korea Patent Application No. 10-2020-7037175, "Notice of Allowance" (in English and Korean), Korean Intellectual Property Office, dated Dec. 6, 2021, 3 pages.

* cited by examiner

| 2 | //// | //// | //// |
|---|---|---|---|
| 1 | 4 | 0 | 5 |
| 3 | //// | //// | //// |

| 4 | 0 | 5 |
|---|---|---|
| 2 | 1 | 3 |

SPHERICAL ROTATION FOR ENCODING WIDE VIEW VIDEO

CROSS-REFERENCE TO RELATED APPLICATIONS

The present application is a Continuation of pending U.S. patent application Ser. No. 16/341,392, filed Apr. 11, 2019, entitled "SPHERICAL ROTATION FOR ENCODING WIDE VIEW VIDEO", which is a National Stage Entry of, and claims priority to, PCT Application Serial No. PCT/US2017/061714, filed Nov. 15, 2017, entitled "SPHERICAL ROTATION FOR ENCODING WIDE VIEW VIDEO", which claims priority to U.S. Provisional Application Ser. No. 62/423,319 filed Nov. 17, 2016 entitled "SPHERICAL ROTATION FOR IMPROVED PANORAMIC VIDEO CODING EFFICIENCY", the disclosures of which are incorporated by reference in their entireties for all purposes.

FIELD

The present description relates to communication of encoded video, and in particular to communicating a spherical rotation of a video with the video.

BACKGROUND

With the emergence of low cost high definition video cameras and high-speed internet connectivity, video internet traffic is growing quickly. 360-degree video is an emerging trend in virtual reality, video conferencing, automotive, and surveillance applications, among others and is supported by wide field of view cameras, including 180 and 360-degree field of view cameras. Dedicated web sites and channels are also available to post and view 360-degree videos, including virtual reality content. For collaboration between groups of users, 360-degree video offers greater flexibility. Instead of switching between cameras, a remote viewer can move across a room using a 360-degree view and zoom in on people or objects of interest in the camera's view.

Panoramic video playback systems using Virtual Reality (VR) head mounted displays are emerging for consumer use. Panoramic and 360-degree video content is typically created by stitching together the 2D videos captured by multiple cameras into a spherical representation. In some cases, the multiple views are rendered in software. The spherical video is then projected into a format suited for video encoding, such as an equi-rectangular projection format or a cube map projection format.

At the client, the bitstream containing the full panoramic compressed video frames is received and decoded, creating a representation of the entire panoramic field of view. A smaller portion of the full field of view is selected for display. This portion is referred to as the viewport and it is the only part that the user can see at any one time. It may be a large part of the total field of view or a small part. The portion of decoded video represented by the viewport is determined by the head position of a head mounted display, or through a position selection user interface when viewing on a normal 2D display. In other words, the position of the viewport is determined by where the viewer is looking or pointing. There may also be a zooming feature for which the field of view and resolution of the viewport is also determined by the user.

BRIEF DESCRIPTION OF THE DRAWING FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity.

DETAILED DESCRIPTION

Spherical projection formats introduce discontinuities and distortions of the video content, relative to the spherical representation. Regions of the video content with discontinuities and distortions are difficult to compress using legacy video codecs, such as HEVC and AVC. As described herein, the video coding efficiency is improved when using legacy video codecs to encode panoramic video content. This improves the video quality and the user experience.

Panoramic video coding efficiency is improved, at least in part, by considering the relationship between the projection format and the regions of the video frame. Fewer bits are required to encode a panoramic video sequence of the same quality and there are fewer subjective artifacts. In some embodiments a new Supplemental Enhancement Information (SEI) message can be defined to indicate spherical rotation, however, other message structures may be used instead. A spherical rotation capability together with such a message may be used to improve video encoding efficiency.

With a constant quantization value, different spherical orientations may result in different encoded video bitstream bit rates. When a planar scene is encoded and when a scene has a small area of high motion or high texture, the video coding is most efficient when that small area is centered in the planar scene. This centering function also applies when a planar projection of a spherical or wide view scene is encoded. As described herein, the sphere of the scene may be rotated before being projected. In this way coding efficiency is improved without making any change to the encoder. The amount of spherical rotation may be selected by a deterministic process by detecting areas of high motion and/or high texture in the panoramic frame, and then centering those areas in a particular position on the sphere before projecting to the rectangular frame. Alternatively, the amount of spherical rotation may be selected through an "a posteriori" process by trying several different spherical orientation values, encoding the different orientation values, and determining which orientation results in the lowest bitrate.

Figure 1:
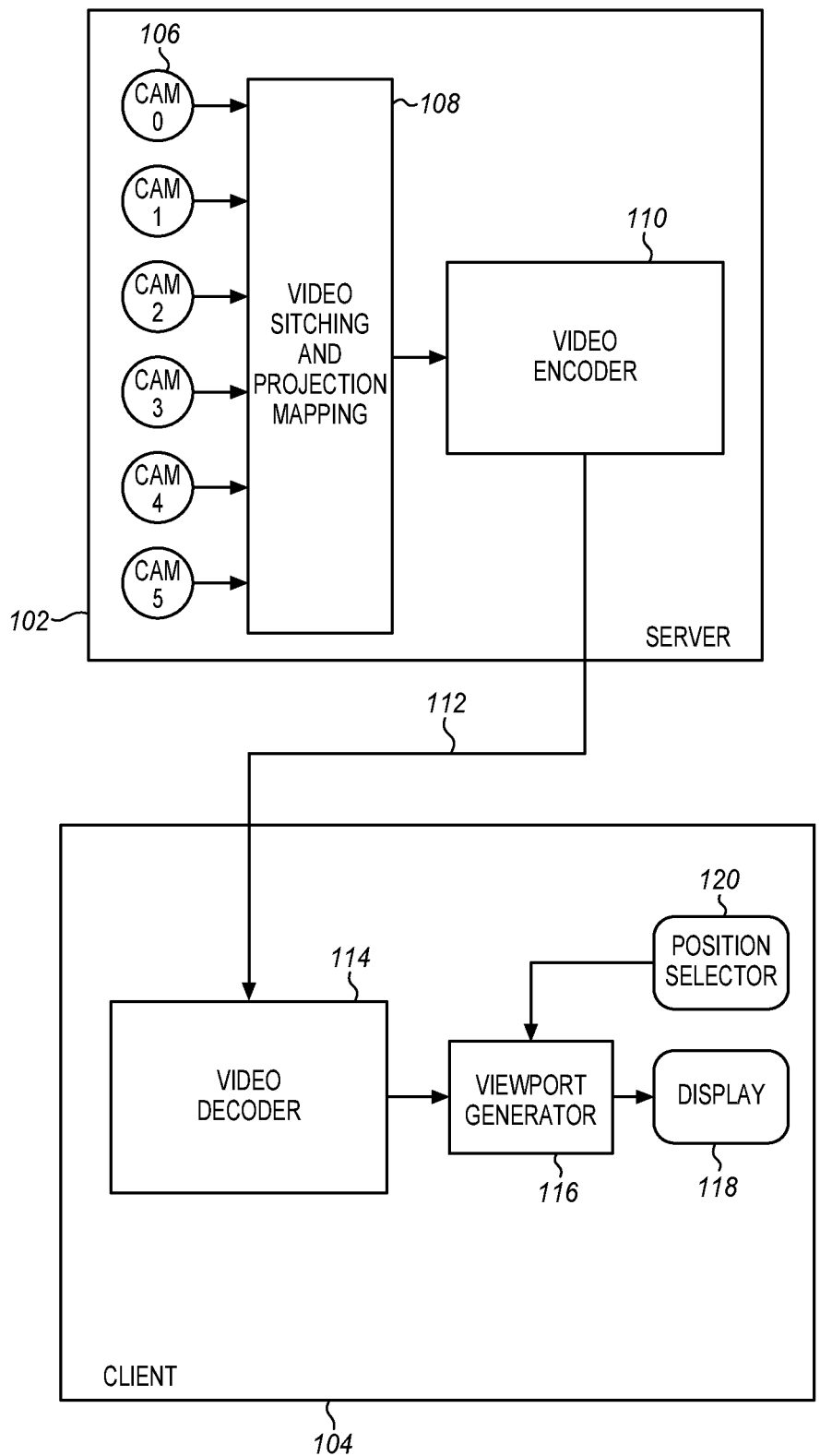
FIG. 1 is a block diagram of a panoramic video coding system according to an embodiment.

FIG. 1 is a block diagram of a panoramic video coding system. Video is produced at a server, production system or a combination of different systems 102. At the server, multiple cameras 106 capture 2D video. Six cameras are shown, but more or fewer may be used. The cameras are connected to a first module 108. At the first module, the multiple videos are stitched together and mapped to a projection format. The stitched video in the projection format is input to a video encoder 110, such as HEVC or AVC. The encoder encodes the video and sends or buffers it for later transmission as a bitstream. The buffer may be a part of the encoder or of another component.

The encoded video is sent as a bitstream through a network, Internet, broadcast, or point-to-point connection 112, from a server or head end to one or more clients 104. At the client, a video decoder 114 receives the video from the server and decodes the compressed bitstream. When only a portion of the decoded video is viewed, a viewport is generated in a viewport module 116 for that selected region. The portion of decoded video to view is determined by a position selector 120 using, for example the head position of a head mounted display or a position selection user interface. The position is sent to the viewport generator that receives the decoded video and provides a suitable video stream to a display 118. The display allows the viewport to be viewed on a normal 2D display.

Figure 2:
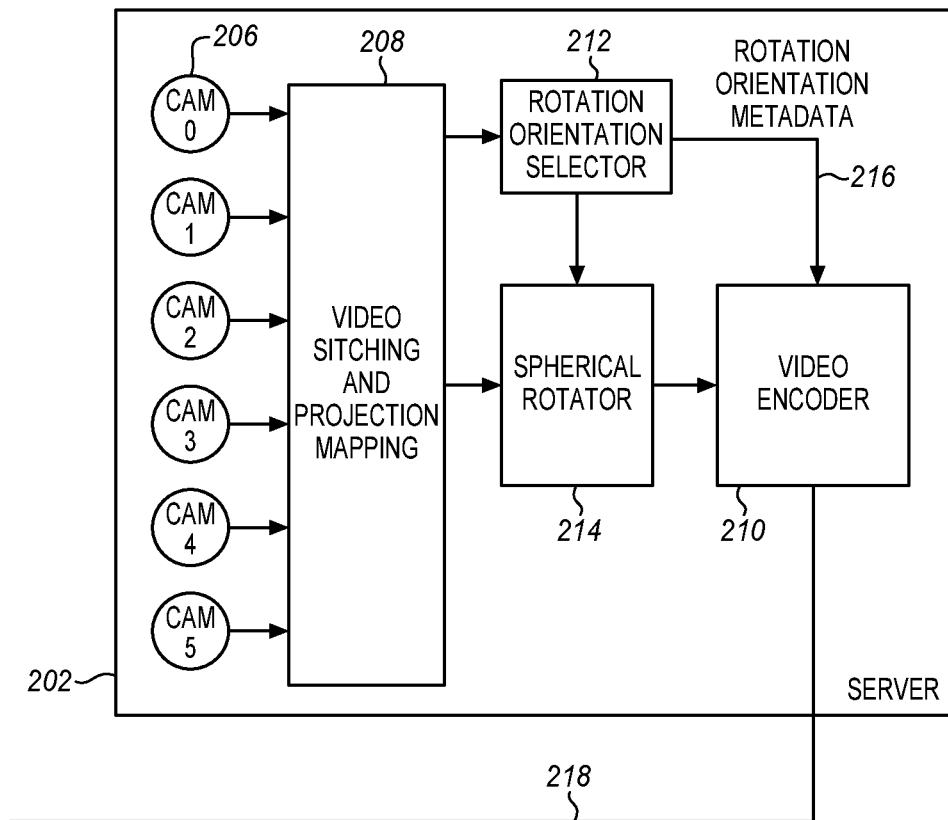
FIG. 2 is a block diagram of an alternative panoramic video coding system according to an embodiment.
Figure 2:
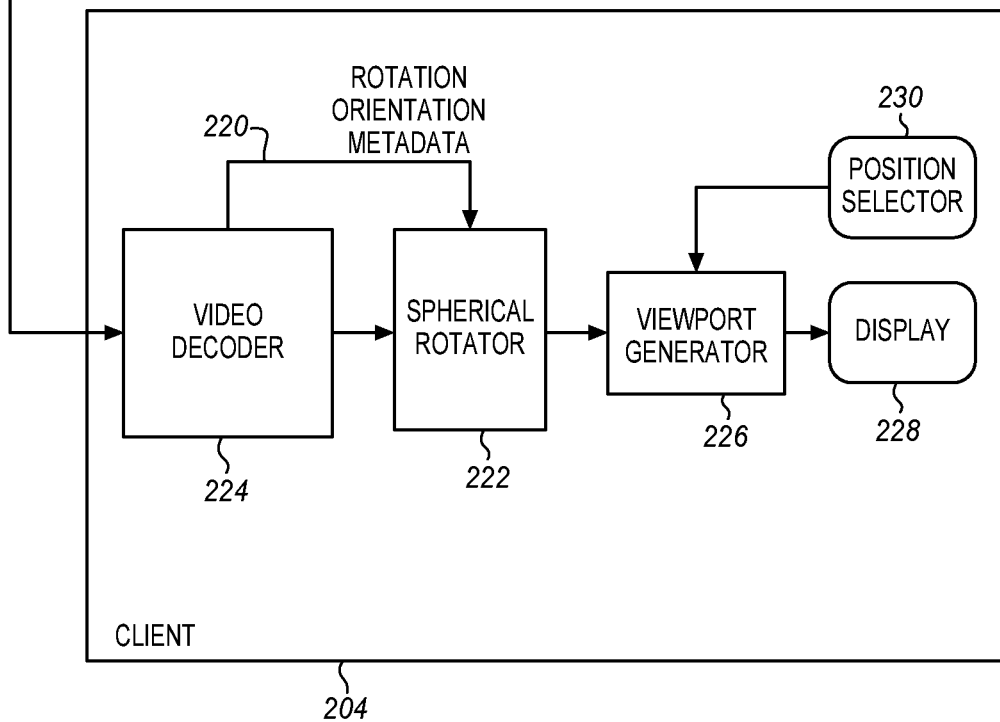

FIG. 2 is a block diagram of an alternative panoramic video coding system. Video is produced at a server 202, production system or a combination of different systems. In some cases, multiple cameras 206 capture 2D video and provide it to the first stitching and projection module 208. The multiple videos are stored in a buffer in this module, stitched together at this module and mapped to a projection format. The stitched video in the projection format is input to a video encoder 210, such as HEVC or AVC.

A spherical rotation orientation selector 212 determines a rotation orientation for the panoramic video, potentially for each video frame, based on estimating which regions of the frame will be the most difficult to encode. This difficulty may be used to position the difficult regions where the projection format introduces the least distortion and discontinuities.

The selector applies the spherical rotation in a spherical rotator 214. The rotator 214 rotates the spherical projection of the stitched video in the projection format according to the selected orientation. The rotated video is input to the video encoder 210. The encoder also receives the orientation selection 216 from the selector. The encoded video is then encoded using this information. In embodiments of the present invention, the rotational orientation selector and spherical rotator may be incorporated into the stitcher or into the encoder. The selector also may generate metadata to represent the spherical rotation orientation. The rotation orientation metadata 216 is added to the video bitstream output of the encoder. It may be added in the form of an SEI message or in another form. The rotation orientation metadata is associated with a frame and therefore can be updated as often as once per frame.

The encoded video may be stored for later at an encoder buffer or a connected memory or sent immediately as a bitstream through a data link 218 such as a network, Internet, broadcast, or point-to-point link from the server 202 or head end to one or more clients 204. At the client, a video decoder 224 receives the video from the server. The video may be stored in a decoder buffer. The buffer decodes the compressed bitstream 218 and extracts any SEI messages. These messages include the rotation orientation metadata 216. As mentioned the rotation orientation metadata may be incorporated in another form. After video decoding, the decoded video is applied to a spherical rotator 222. The rotation orientation metadata 220 is also provided from the decoder 224 to the rotator. The rotator applies an inverse of the spherical rotation process that was applied prior to encoding to the decoded video.

A viewport generator 226 receives the decoded and rotated video and provides a suitable video stream to a display 228. At the client end, the viewer can select a viewport using a position selection 230 or other sensors. The viewport module receives the selected viewport for the video and adjusts the view for the display accordingly. A viewport is then generated and sent directly to the display 228 for viewing. In some embodiments, the video with the generated viewport is stored for viewing later. The video storage may be in a buffer or memory of the viewport generator or of a related component. The video may then be sent later or immediately to the display for the user to view.

Figure 3:
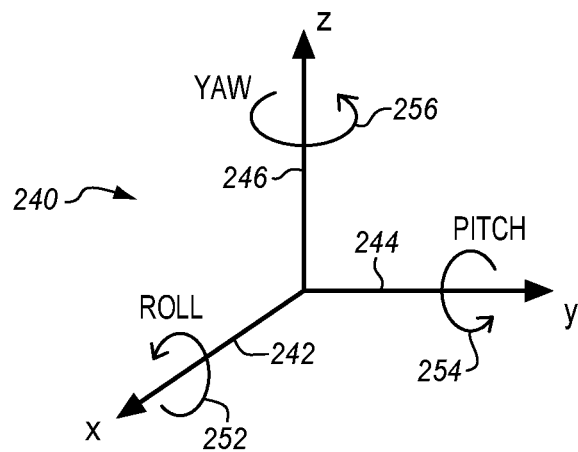
FIG. 3 is a diagram of a three-axis Cartesian coordinate system showing rotational directions for pitch, yaw, and roll.

The metadata representing the rotational orientation from a rotation orientation selector, a decoder, or a position sensor may contain three or more parameters including pitch, yaw, and roll. FIG. 3 is a diagram of a three-axis Cartesian coordinate system 240 showing rotational directions for pitch 254, yaw 256, and roll 151. The three axes are the x-axis 242, the y-axis 244, and the z-axis 246. The rotational directions are a clockwise rotation about each axis as seen from the origin of the frame of reference. Roll is around the x-axis. Pitch is around the y-axis, and yaw is around the z-axis. The axes may have different names, such as horizontal, vertical, or depth or any other suitable names. While the present embodiments are in the form of rotations around axes of a Cartesian coordinate frame of reference. The rotation of the spherical projection may be represented in any other desired way using other types of coordinate systems and projections.

This metadata may be included in a Supplemental Enhancement Information (SEI) message, as used in the HEVC and AVC standards. Using an SEI message allows legacy encoders and decoders to be used because the normative encoding and decoding process is unchanged. Rotation may be applied as a preliminary process 214 at the transmitter 202 and as a post process 222 at the receiver 204 or in other positions in the process, depending on the particular implementation. The post-process spherical rotation is applied to the decoder's output pictures.

As alternatives to SEI and metadata, the rotation orientation metadata may be included in a parameter set in a video codec, or in a slice header. In this case, the definition of conformant output pictures may be changed such that the inverse spherical rotation is already applied before a picture is output.

With either metadata signaling method, the application of the inverse spherical rotation function may be combined with the viewport generation process, with very little additional client complexity.

TABLE 1

|  | Descriptor |
|---|---|
| spherical_orientation( payloadSize ) { |  |
|     spherical_orientation_cancel_flag | u(1) |
|     if( !spherical_orientation_cancel_flag ) { |  |
|         absolute_orientation_present_flag | u(1) |
|         relative_orientation_present_flag | u(1) |
|         if( !absolute_orientation_flag ) { |  |
|             absolute_pitch | ue(v) |
|             absolute_yaw | ue(v) |
|             absolute_roll | ue(v) |
|         } |  |
|         if( !relative_orientation_flag ) { |  |
|             relative_pitch | ue(v) |
|             relative _yaw | ue(v) |
|             relative _roll | ue(v) |
|         } |  |
|         spherical_orientation_persistence_flag | u(1) |
|     } |  |
| } |  |

Table 1 is an example of a syntax for an SEI message as an example of metadata parameters that may be used for rotation orientation. This metadata has flags to indicate whether spherical orientation is to be applied and whether an absolute or a relative orientation is being provided. As mentioned above, spherical orientation changes are most useful when the regions of interest are at the edges of the projection where distortion is high. In some implementations, spherical orientation is not changed for regions near the center of the projection. The metadata also includes one or more of pitch, yaw and roll for the two different types of spherical orientation, absolute and relative. The pitch, yaw, and roll may also be provided in any of a variety of different units, such as degrees, radians, or linear distance. Actual values may be used or fractional values. The values may be encoded with a fixed length code or a variable length code and may be in equal fractional or scaled steps. The flags may be used to allow the spherical orientation module to work more quickly by ignoring any unused metadata.

TABLE 2

|  | Descriptor |
|---|---|
| spherical_orientation( payloadSize ) { |  |
|     sphere_rotation_cancel_flag | u(1) |
|     if(! sphere_rotation_cancel_flag) { |  |
|         sphere_rotation_persistence_flag | u(1) |
|         sphere_rotation_reserved_zero_6bits | u(6) |
|         yaw_rotation | i(32) |
|         pitch_rotation | i(32) |
|         roll_rotation | i(32) |
|     } |  |
| } |  |

Table 2 is an alternative example of a syntax for an SEI message that may be used to send metadata parameters about spherical rotation information. In this example, the relative or absolute rotation choice is removed and so the syntax contains only a spherical rotation flag and then the yaw, pitch, and roll values. These values may be relative, absolute, or another type depending on the context.

As shown in Tables 1 and 2, the spherical orientation or sphere rotation SEI message provides information on rotation angles yaw ($\alpha$), pitch ($\beta$), and roll ($\gamma$) that are used for conversion between global coordinate axes and local coordinate axes.

In some embodiments, setting the sphere_rotation_cancel_flag equal to 1 indicates that the SEI message cancels the persistence of any previous sphere rotation SEI message in output order. Setting the sphere_rotation_cancel_flag equal to 0 indicates that sphere rotation information follows.

The sphere_rotation_persistence_flag may be used to specify the persistence of the sphere rotation SEI message for the current layer. Accordingly, in some embodiments, setting the sphere_rotation_persistence_flag equal to 0 specifies that the sphere rotation SEI message applies to the current decoded picture only.

Consider an example in which picA is the current picture. sphere_rotation_persistence_flag equal to 1 specifies that the sphere rotation SEI message persists for the current layer in output order until one or more of the following conditions are true:

A new CLVS (Coded Layer-Wise Video Sequence) of the current layer begins.

The bitstream ends.

A picture picB in the current layer in an access unit containing a sphere rotation SEI message that is applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

sphere_rotation_reserved_zero_6 bits is reserved in this example and may be used to indicate bitstream types, versions of a specification or for other purposes.

yaw_rotation specifies the value of the yaw rotation angle. In some embodiments the rotation may be indicated as units of $2°$-$16°$. The value of yaw_rotation may be range limited (e.g. $-120°$ to $+120°$) to reduce the number of bits. A 0 or absent value may be used to indicate that there is no rotation.

pitch_rotation specifies the value of the pitch rotation angle and roll rotation specifies the value of the roll rotation angle. These values may be indicated in the same or different ways with the same or different possible values.

The spherical rotational orientation metadata can be sent for an entire coded video sequence, and/or per frame. The signaled values, i.e. the pitch, roll, and yaw parameters in the metadata, indicate how the spherical rotation is to be applied to the output images following the decoder. In many cases, the parameters will be the inverse of the rotation applied at the encoder.

Both absolute and relative values can be sent for the spherical rotational orientation. Relative orientation values may be signaled with respect to the absolute position, and can change per frame. For content captured with a moving camera, the absolute orientation value might reflect the orientation of the moving camera, while the relative orientation may be selected based on the position of moving objects. At the client, the absolute and the relative orientation values can be combined before performing the spherical rotation.

The spherical orientation and metadata described herein may be used with any projection format used for encoding, such as equi-rectangular projection, cube map projection, octahedral projection, icosahedral projection, truncated square pyramid projection, etc. The rotation is applied to the spherical representation, rather than directly to the projection format pixels. If the coded picture contains conformance cropping, the rotation is applied after the conformance cropping operation has taken place.

The process of selecting the rotation orientation metadata values is dependent upon the particular projection format used, because the discontinuities and distortions introduced during projection mapping vary based on the projection format.

Figure 4:
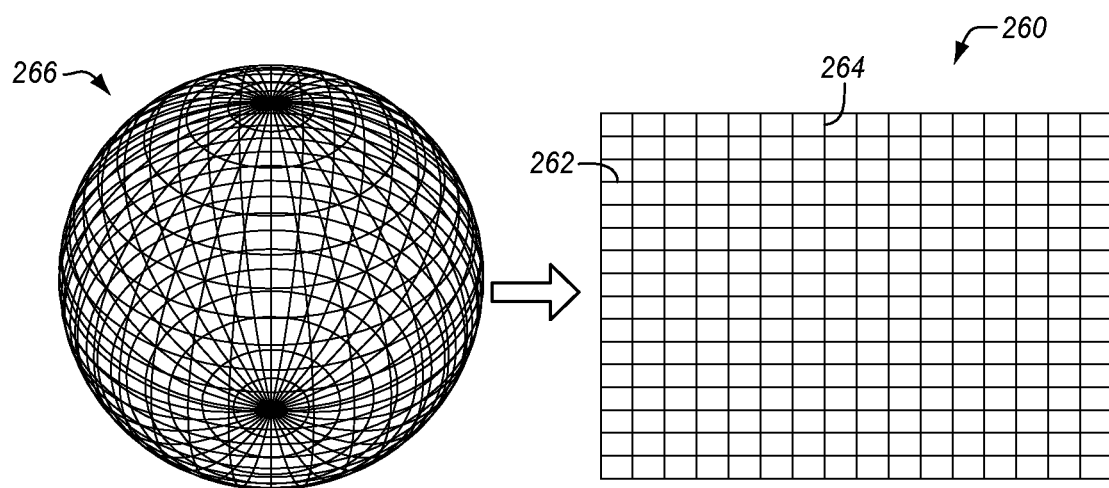
FIG. 4 is a diagram of an equi-rectangular format projection from a sphere to a planar surface.

FIG. 4 is a diagram of an equi-rectangular format projection. The original spherical view 266 is shown on the left and the projection of the sphere onto an unwrapped planar grid 260 is shown on the right. Discontinuities are introduced at the left 262 and right 264 edges of the rectangular planar frame 260 on the right. With the real-world spherical representation on the left, the left and right edges connect. In addition, significant warping distorts pixels along the top and bottom of the frame on the right. This corresponds to the north pole and south pole regions on the left. A particular suggested viewport might cross the left and right edges of the equi-rectangular format, and hence would correspond to two different regions in the coded projection format frame. Similarly, a particular suggested viewport might cross through different parts of the top edge and be distorted.

Current video coding standards which use spatial directional intra-prediction and block translational motion compensation will perform better near the center of the equi-rectangular prediction than near the poles, or along the left and right edges. An object which stretches across the left/right edge discontinuity would not be well predicted using spatial intra-direction position or with motion compensation.

Figures 5, 6, 7:
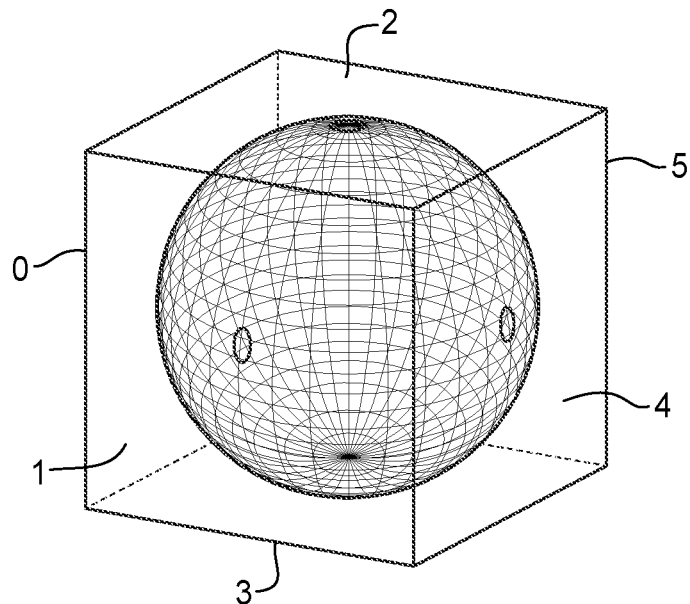
FIG. 5 is a diagram of a cube map projection in which a sphere is projected onto six planar faces labeled 0 to 5.
FIG. 6 is a diagram of a 4×3 planar grid with the six faces of a cube map projection.
FIG. 7 is a diagram of a 2×3 planar grid with the six faces of a cube map projection rearranged for compactness.

In the cube map projection, six cube faces are arranged into a rectangular frame. FIG. 5 is a diagram of a cube map projection in which a sphere is projected onto six planar faces labeled 0 to 5. Each of the 6 faces is projected onto a part of the sphere. The faces may then be represented on a planar grid. FIG. 6 illustrates a 4×3 planar layout of the six faces in which adjacent areas of the projection are placed next to each other. As shown, the boundaries between faces 1 and 2, 1 and 3, 1 and 4, 4 and 0 and 0 and 5 are maintained adjacent. However, no other boundaries are placed adjacent to each other as they are in FIG. 6. The 2 and 3 faces may be moved to be on either side of face 4, 5, or 0 to maintain those boundaries instead. While the planar grid representation is well suited for many codecs and other digital processing and compression systems, there are some areas of the planar frame of FIG. 6 that do not contain pixels representing the cube. These are the areas above and below faces 4, 5, and 0. These faces may be set to a background color but require some data to encode. FIG. 7 illustrates a 3×2 planar layout, where the cube faces have been rearranged to fit into a more compact layout. The FIG. 7 representation may require some additional complexity in processing edges but the number of pixels is reduced by one half from 4×3 to 3×2.

The selection of a rotation orientation for encoding of a cube map projection format will depend upon the particular layout selected, as the projection formats differ in the number and positions of discontinuities. The edge regions of each cube face have more distortion than the center region of the cube face. The selection of the rotation orientation should particularly attempt to minimize objects straddling across discontinuities in cube face edges. Other projection formats which contain faces with edges also introduce similar discontinuities and distortions.

Figure 8:
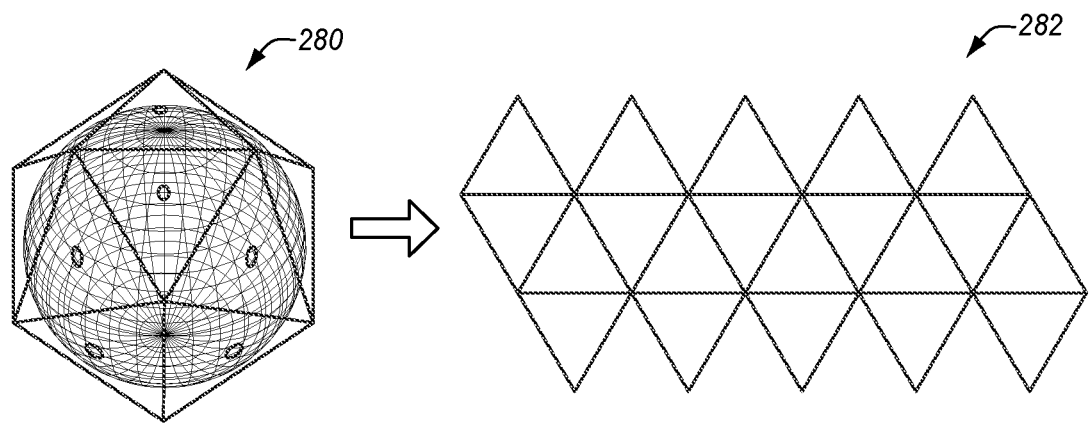
FIG. 8 is a diagram of an icosahedral format projection from a sphere to a planar surface.

FIG. 8 is a diagram of an icosahedral projection. This is another type of projection from a spherical representation to a planar representation using an icosahedron. In this example, the left side shows a sphere 280 projected onto the 20 facets of a surrounding icosahedron, rather than the only six facets of the cube map of FIG. 5. The 20 facets are then shown as laid out on a two-dimensional space 282 on the right. As with the other projections, there are distortions and inconsistencies at the edges of each of the facets. Using more facets reduces the amount of distortion but increases the numbers and positions of the seams.

Any of a variety of other projections may also be used as mentioned above including octahedral, truncated square pyramid, and any of a variety of other types of polygonal projections. With more facets, the distortion of each facet is reduced, but complexity may be increased and it may be more difficult to avoid the edges.

In some embodiments, the spherical rotation orientation can be selected as part of the encoding process. In some embodiments, the spherical orientation can be selected through an "a posteriori" process by trying several different orientation values, encoding the different orientation values with a constant quantization value, and determining which orientation results in the lowest bitrate. In some embodiments, hierarchical methods can be used with the approach, such that a downsampled version of the frame is encoded rather than the full resolution frame.

In some embodiments, the rotation value is accordingly selected by first encoding video for a planar projection of rotated projections with different rotation values. This results in multiple video samples, one for each rotation value. The sphere or the planar projection of the sphere, or both may be downsampled before the encoding. The bitrates for each of the encoded videos samples is measured and compared to determine which video sample has the lowest bitrate. The rotation value corresponding to the encoded video with the lowest bit rate is then selected as the rotation value to be used to encode the video. Such a determination may be repeated for each scene change or each significant change in the nature of the spherical video.

An alternative approach is to detect areas of high motion and/or high texture in the panoramic frame, and aim to center those areas in the equi-rectangular frame, or in a cube face, depending on the projection format being used. The selected rotation is then the rotation that places the high motion area at a center of the planar projection. Using the characteristics of the projection the center of the planar projection may correspond to a particular position or region on the sphere. This may allow the rotation to be selected directly as a particular position on the sphere.

The SEI message as described above may be used in combination with a spherical selected viewport SEI message. When the two SEI messages are used together, the rotation suggested by the spherical rotation information orientation SEI message may be applied first, and then the suggested viewport location from the suggested viewport SEI message determined with respect to the rotated spherical representation.

If frame packed stereo video is contained within the video frame, either orientation values may be sent separately for each view, or values for the second view may be derived based on the first view's value, possibly considering any information about the relative position of the second view to the first view.

Figure 9:
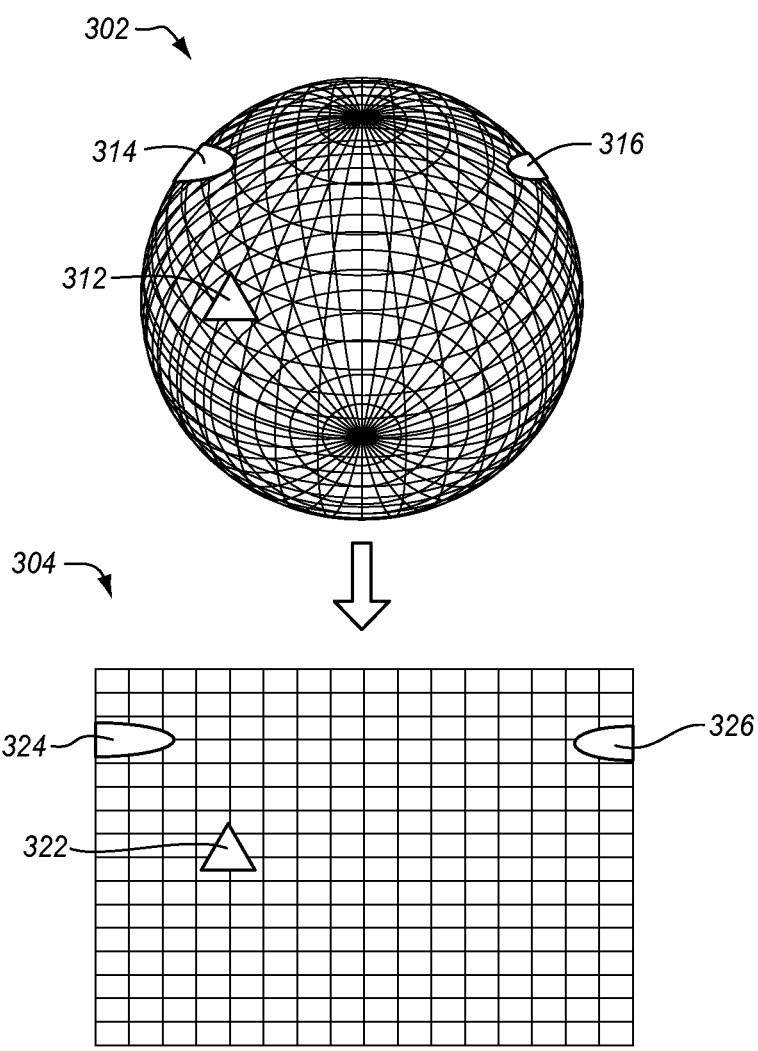
FIG. 9 is a diagram of an equi-rectangular format projection of two objects from a sphere to a planar surface without rotation according to embodiments.

FIG. 9 is a diagram of a sphere 302 that has a panorama multiple camera view and an equi-rectangular projection of the sphere onto a planar surface 304. In this example, video content is represented as an oval 314, 316 and a triangle 312 in the sphere. The two portions of the oval 314, 316 represent the same oval as seen on two side of the panorama view. These objects are projected into the equi-rectangular mapping 304 and show up as two parts of the same oval 324, 326 and the triangle 322. In the equi-rectangular mapping, the oval has a discontinuity 324, 326 across the left and right edges. It is also stretched horizontally because it is close to the north pole.

Figure 10:
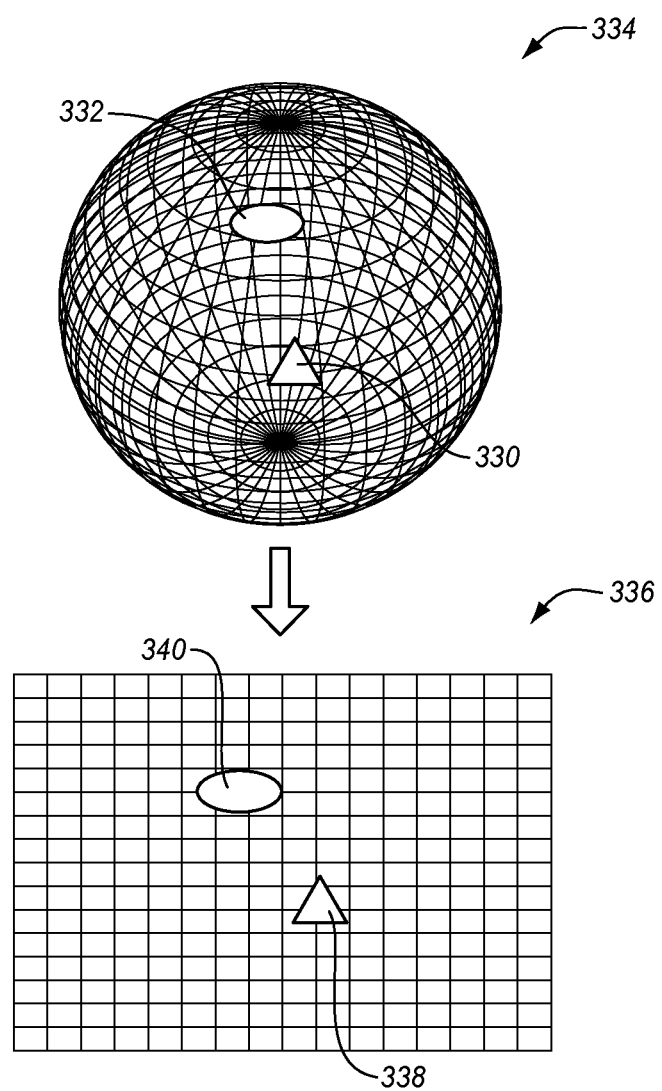
FIG. 10 is a diagram of an equi-rectangular format projection of two objects from a sphere to a planar surface with rotation according to embodiments.

FIG. 10 is a diagram of the sphere 334 and the rectangular mapping 336 of the same content after spherical rotation has been applied to the sphere. The oval 332 of the rotated sphere is now closer to the center of the frame. The triangle 330 is as close to the center as the oval, so the distortion of the two items will be about the same. In an equi-rectangular projection every two-dimensional object is distorted. The amount of distortion increases with distance from the center. As shown with the rotated sphere 334 as compared to the same sphere 302 without the rotation, there is no longer a discontinuity in the oval. Since the oval is closer to the center of the frame, there is also less distortion. The triangle is also improved but not as significantly. The planar grid 336 of the projection makes it clearer that the projected oval 340 and the projected triangle 338 are close to the middle of the grid where distortion is less and the oval is not in one part instead of two as with the projection 304 before rotation. A video that is encoded based on the rotated of frame should code more efficiently by a legacy video encoder than a video using the frames that are not rotated.

Returning to FIG. 2, the unique structure and configuration improves a user's experience for panoramic video, 360° video, VR video systems and any other wide field of view system that uses a projection. The operation of the structure may be better understood in light of the description of spherical to rectangular mapping above.

On the server or sender side 202, the projection mapping 208 receives a wide field of view video. In the figure, the video is received from multiple cameras 206 and so the mapping module 208 or another video stitcher stitches the video from the multiple cameras together to produce a single wide field of view video. In other cases, the video may be previously stored and then retrieved for encoding or some or all of the video may be generated by a graphics system based on software and user input. The video input may include a simulated or virtual world or there may be virtual and real parts combined together. The video may be 180°, 360°, panoramic, or any other wide field of view. The video may have a wider horizontal field of view than a vertical field of view.

The complete stitched-together wide field of view video, however generated or received, is then mapped into a planar projection. Any of a variety of different projections may be used including those shown and mentioned above. Equi-rectangular projection, spherical cube projection, and icosahedral projection are shown and described but there may be other projections instead.

In the examples shown herein, the video is spherical and the rotation is referred to as spherical rotation, however, a complete sphere is not required. The video may contain only a portion of a sphere. The 180° field of view mentioned above is only half of a sphere. The field of view may be reduced both horizontally and vertically to show only a portion of a sphere. On the other hand, the field of view is curved in the manner of a portion of a sphere. This allows the image to be the same distance from a viewer in all directions.

This curved image is then projected onto a planar surface using any desired type of geometry including the examples shown above. While the curved field of view, being all or part of a portion of a sphere, has no inherent distortions, a planar projection of such a curved surface does have distortions. The planar projection, however, is well suited to encoding, compression, and other image processes.

Before the video is mapped, it is analyzed 212 to select a suitable rotation of the projection. The selection is made so that important areas or regions of interest are not on the margins or edges of the planar projection. This reduces distortion and other effects that may be noticed by the user. In some embodiments, such as with virtual reality, a viewport is received from the user through a user interface 230 or some other controlling entity. The viewport indicates which part of the wide field of view video will be in the user's field of view on the display 228 and therefore in the middle of the user's field of view. In other embodiments, there is an area or region of interest. This area or region may have a speaker, a character, a newly appearing object or some other characteristic that makes it more important than other areas. This area or region may then be selected as the most important, corresponding to a viewport. The region of interest may be determined by a video editor and conveyed to a selector 212 at the head end or it may be selected by the user through an interface 230.

The received or generated viewport is then compared to the edges of the planar projection is a rotation selector 212. If the viewport is near the edge of the projection, then a rotation is selected to move the viewport away from an edge of the planar projection. This rotation is applied to the video when it is being encoded 210 to eliminate or reduce the distortion that is inherent to the projection. The amount of rotation may be determined by comparing the edges of the viewport to the edges of the planar projection. If the edge is too close, as measured, for example by a pre-determined distance threshold, then a rotation is selected to move the edges of the viewport away from the edge by at least a predetermined distance from the edges of the projection. This distance may be the same pre-determined threshold distance or another threshold distance.

The rotation distance may be expressed in many different ways. In spherical coordinates, roll, pitch, and yaw are used to express position on the sphere. One or more of these may be used or Cartesian coordinates, e.g. vertical and horizontal distance may be used with reference to the projection. For roll, pitch, and yaw, it is not required that all three be used. Only one may be required to move the region of interest away from the poles. A second coordinate may be used to indicate distance from the left and right seam edges. The rotation information for roll, pitch, and yaw may be expressed as an angle. The angle of rotation will be relative to the original orientation of the video in some embodiments. In addition, the absolute orientation of the video may be included in the metadata. The absolute orientation reflects an orientation of a camera or of one or more of the multiple cameras when there is a camera array. Relative orientation, absolute orientation, or both may be used depending on the particular implementation.

After the rotation is determined then the spherical rotation selector 212 generates rotation orientation metadata 216 describing the selected rotation. This is provided to the spherical rotator 214 to be used to rotate the projection based on the selected rotation. The metadata is also provided to the encoder 210 so that the rotated projection is encoded as encoded video including the rotation orientation metadata. The rotated encoded video with the metadata is then transmitted, buffered, or stored 218 so that it can be provided as encoded video for display. For many types of encoding, such as HEVC and AVC, an SEI message may be used for example the SEI messages described above, although the invention is not so limited.

The selection of an amount of rotation may be made for each frame of the video or for each frame in which the region of interest moves. SEI messages are tied to a particular frame so that each frame at which the region of interest has moved may have its own message. In some cases, the message may be to cancel all rotation for the next set of frames until a new message is received. This allows each scene and region of interest change to be flagged with a different SEI message to change the orientation for the corresponding frame.

At the receiver or client side 204, the encoded video 218, including the metadata 216, such as an SEI message, is received from the server or broadcaster 202. The client has a decoder 224 to decode the video and to extract the rotation orientation metadata 220. The decoded video may then be rotated 222 based on the rotation orientation metadata. The rotation may be determined by a pitch, roll, and yaw angle or in some other way. This rotated video is then provided to a display 228, such as a headset, 3D monitor, or 2D display screen for viewing by the user. For many applications, there will be a viewport selected by the user. This may be done through a conventional user input device 230 or through some other sensor. For a VR headset, the movement of the headset or user's eyes may be detected and the viewport determined based on where the user is looking. A viewport generator 226 then generates a view of the rotated decoded video.

As mentioned above, the received encoded video is a projection of a wide field of view received from multiple cameras or generated by a graphics system. The projection may be an equi-rectangular projection or any other suitable planar projection. Many video encoding systems allow metadata, such as SEI messages, to be associated with a particular frame of the encoded video. As a result, when the decoder finds a new SEI orientation rotation message, the spherical rotator may be commanded to change the rotation for the corresponding frame using the new message. The rotation may then be maintained until the next message comes. As a result, additional metadata can be received for additional frames of the encoded video.

Figure 11:
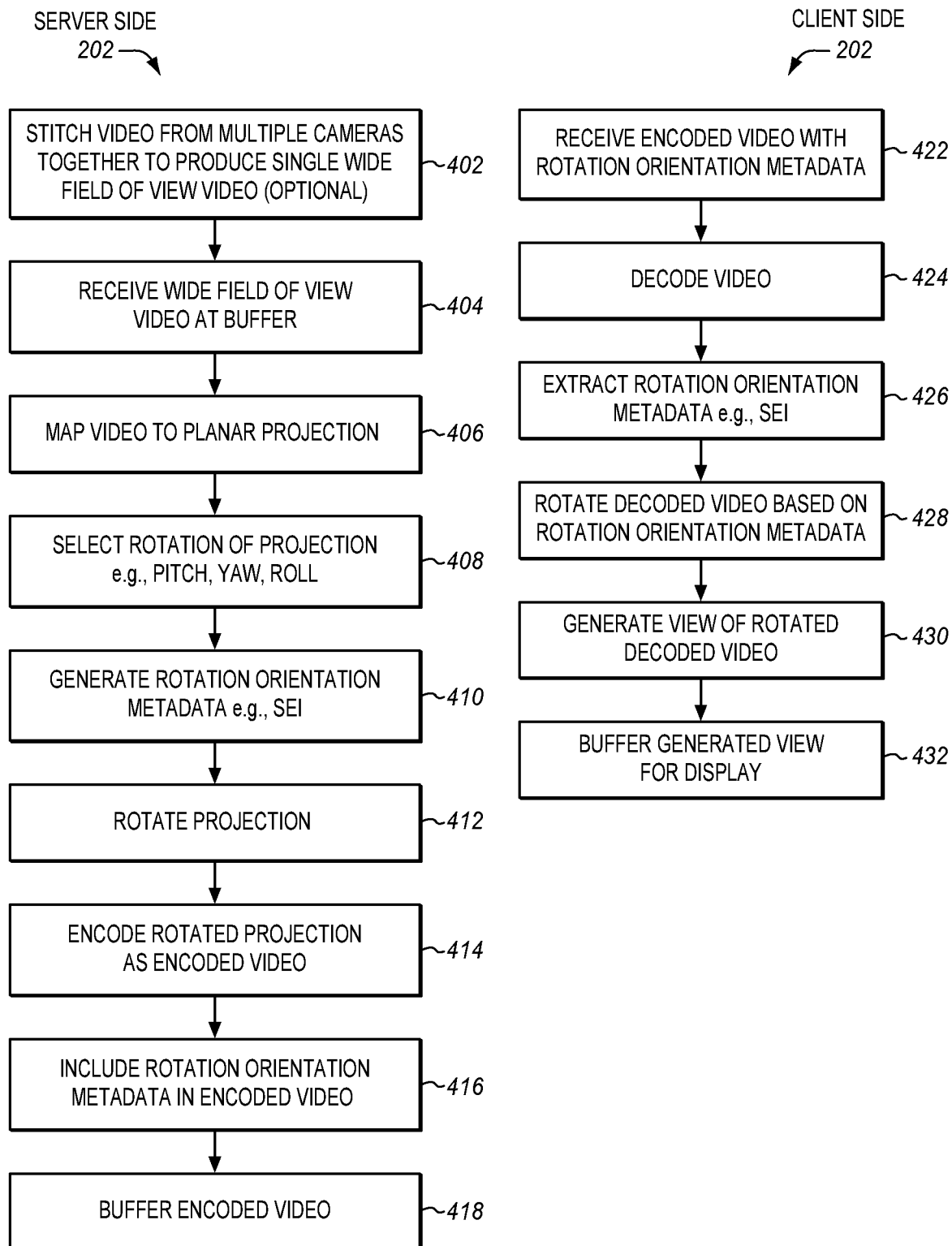
FIG. 11 is a process flow diagram of spherical rotation of a video for encoding and viewing according to embodiments.

FIG. 11 is a process flow diagram to show operations that are performed by the hardware described herein. The operations include sending rotation information with a video and extracting and using that rotation information after receiving the video. The process begins at a server, broadcaster, producer, or head-end terminal or station with receiving 404 a wide field of view video at a buffer. This video may be produced in a variety of different ways. In some cases, at 402 the video is stitched together from multiple camera video sources to produce the single wide field of view video. These cameras may be local or remote and the video may be received in real time or from storage after a short or long storage duration. In other cases, a single wide field of view camera may be used. The field of view may be as wide as a half circle or full circle with currently available cameras.

At 406 the video is mapped into a planar projection. This is normally done in a projection mapping module that has dedicated hardware resources working in parallel to affect each pixel of the received spherical input video. Several different types of projection are described above, but others may be used instead. The planar projection allows the panoramic or wide view video to be encoded and decoded using commonly available encoding systems that are designed for much narrower fields of view and with a planar image stream.

At 408 a rotation is selected for the projection. The rotation may come from a user on a client side that desires a particular viewport. The rotation may come from an editor, producer or publisher that determines that a particular viewport is more important or better suited to the intended use or experience of the video. The rotation allows the viewport to be moved to part of the projection that has low distortion. Typically, the viewport is moved away from edges and seams of the projection which have high distortion. The particular amount and type of movement will depend upon the type of projection because different projections have different amounts of distortions in different locations. The rotation may be expressed in terms of relative or absolute rotation and in different types of units. Pitch, yaw, and roll are shown in FIG. 3, but not all of these values may be needed and other types of coordinates such as angles, distances, latitude and longitude, etc. may be used instead. As an example, the sphere may be rotated using only pitch and yaw.

After the amount of rotation has been selected, then rotation orientation metadata is generated at 410 to describe the selected rotation. This metadata may be in a variety of different formats. An SEI message is described above, but other formats and configurations may be used instead. At 412 the projection is rotated in accordance with the selected rotation and as described in the rotation metadata.

At 414 the rotated projection is encoded as a video bitstream. At 416 the rotation orientation metadata is included in the encoded video. At 418 the encoded and rotated video is then transmitted, stored, or otherwise handled. Typically, the video is stored for immediate or later delivery to remote viewers, however, it may be viewed locally as well.

After the video is transmitted, the process may continue at the client or user side to receive and use the rotated video. Since the video includes an indication of how it has been rotated it may be decoded and displayed in the rotated configuration or the rotation may be reversed and a different viewport may be used when the video is displayed. The client side process begins at 422 with receiving encoded video that includes the rotation orientation metadata. This may be the SEI described above in any desired format or any other type of included metadata. At 424 the video is decoded. At 426, the rotation orientation metadata is extracted. At 428, the decoded video is rotated based on the rotation orientation metadata. The rotated video is then used to generate a view of the rotated decoded video at 430 which then buffered at 432 for display.

The received video has been rotated already at the server side before the video is encoded. The video may be displayed with this particular rotation without any additional rotation. A viewport would then be applied to the rotated video based on user command. By first rotating the video before encoding, the distortion of the planar projection is avoided for the most critical part of the total field of view. When the user receives the video and decodes it, it can then be converted back to a spherical projection from the decoded planar version. The rotation SEI allows the client side system to determine the original orientation of the spherical video. This allows the user experience to be properly oriented. If the user commands a different viewport than the one selected at the server side, then the system can apply that viewport accurately based on the properly oriented spherical projection.

Figure 12:
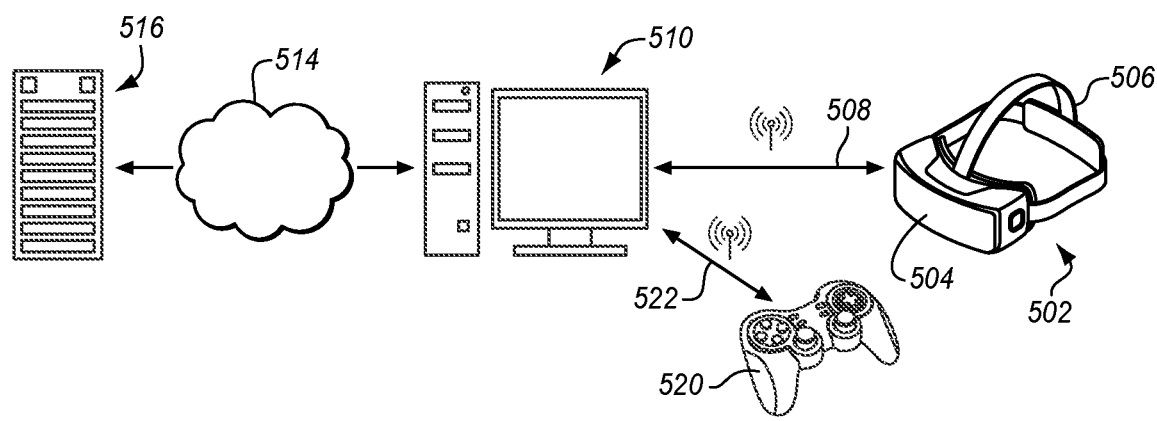
FIG. 12 is a block diagram of a head mounted display with connected computing resources suitable for embodiments.

FIG. 12 is a diagram of high performance HMD (Head Mounted Display) with multiple remote information sources. An HMD 502 has a main body 504 and an attachment strap 506. The main body carries user displays and speakers to render the virtual world to the wearer. The main body also has inertial sensors, a microphone and other user input devices. A processing, communications, and power or battery suite allow the HMD to render video and sound and to communicate wirelessly 508 with a tethered computer 510.

The user interacts with the virtual world through head and body movements and may also interact using voice commands, hand gestures and other user input devices. A game controller 520 may be coupled to the tethered computer through the same 508 or another 522 wireless interface to provide additional controls. The HMD may be coupled to the computer through a WiFi, a WiDi, or another high speed digital wireless connection to receive rendered or compressed video frames and audio from the computer for display to the user. Additional descriptions, data, parameters, and commands may also be received from the computer. The HMD may also send command, control, and virtual interaction data to the computer through the same or another wireless link. The controller, for example may communicate through Bluetooth or unlicensed bands. Multiple wireless interfaces may be combined to provide the complete user experience.

In some cases, the computer is portable and carried by the user. This allows for a wired connection, if desired. The carried computer may have a notebook, tablet, smartphone, or any other desired physical configuration. In other cases, the computer is fixed and is attached to the HMD using a wired connection.

The computer may in turn be connected through the Internet, a LAN (Local Area Network) or other connection 514, wired or wireless, to a remote server 516. The remote server provides encoded video and may provide additional information about the virtual world. The remote server may also provide communication with other users that are experiencing the same or a related virtual world. Alternatively, the HMD may communicate directly with the server without going through the computer 510. In other embodiments, no remote server is used and the tethered computer operates independently.

In the examples herein, a wireless HMD has a local computing resource or client device, such as a CPU (Central Processing Unit) that may be coupled to a GPU (Graphics Processing Unit), graphics processor, memory and other resources to allow the HMD to store and render received encoded video. The local rendering may include rotation and viewport generating as described, among other tasks.

Figure 13:
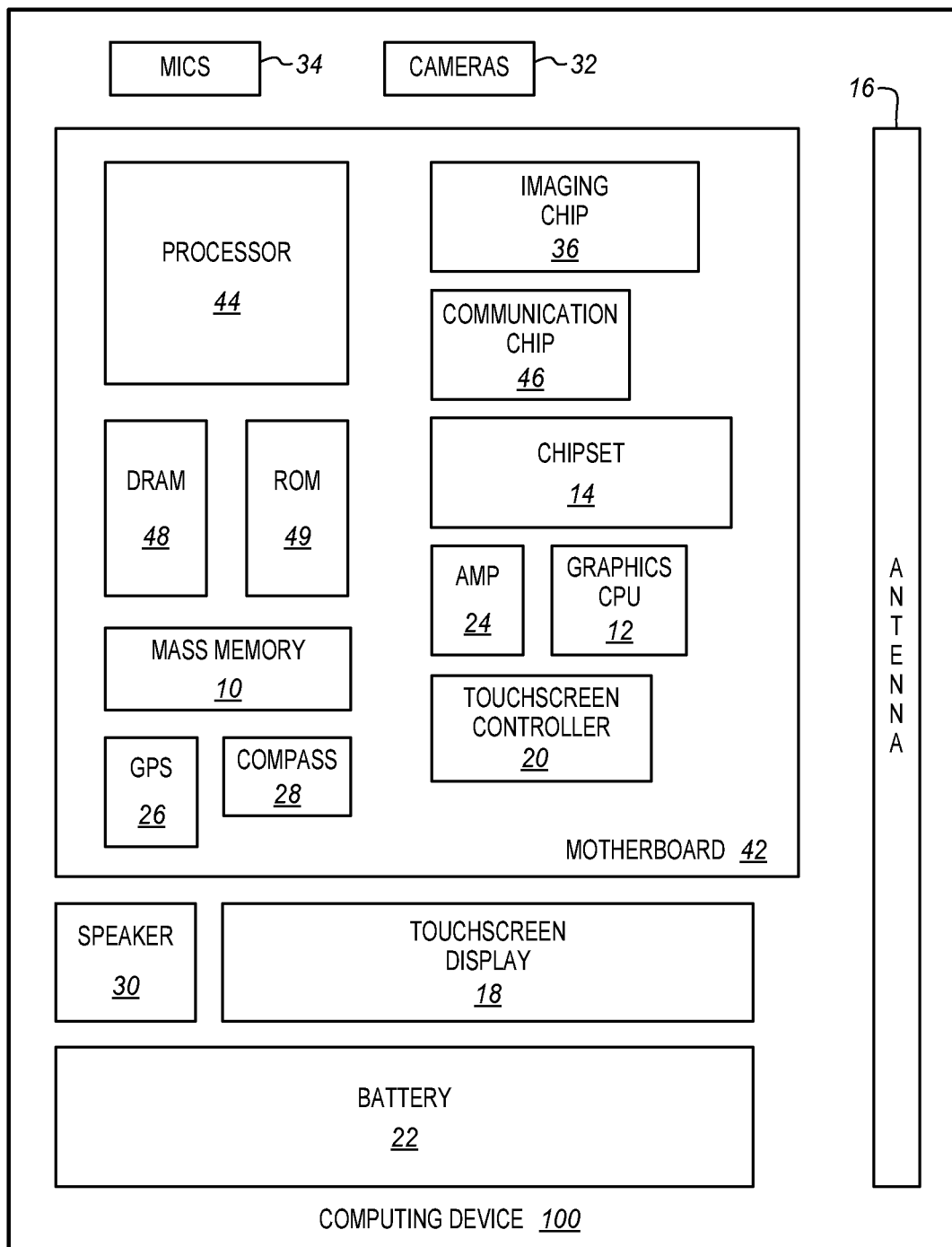
FIG. 13 is a block diagram of a computing device suitable for video capture, encoding, decoding, and display according to an embodiment.

FIG. 13 illustrates a computing device 100 in accordance with one implementation. The computing device 100 houses a system board 42. The board 42 may include a number of components, including but not limited to a processor 44 and at least one communication package 46. The communication package is coupled to one or more antennas 16. The processor 44 is physically and electrically coupled to the board 42.

Depending on its applications, computing device 100 may include other components that may or may not be physically and electrically coupled to the board 42. These other components include, but are not limited to, volatile memory (e.g., DRAM) 48, non-volatile memory (e.g., ROM) 49, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera array 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The camera array may be coupled to an image chip 36 and to the processor 44, either directly or through the image chip. The image chip may take a variety of different forms, such as a graphics co-processor, a digital signal processor (DSP), an image signal processor (ISP), or any other type of separate dedicated imaging management module. Such a device or module may comprise logic, algorithms, and/or instructions operative to capture, process, edit, compress, store, print, and/or display one or more images. In some embodiments, the imaging management module may comprise programming routines, functions, and/or processes implemented as software within an imaging application or operating system. In various other embodiments, the image processing may be implemented as a standalone chip or integrated circuit, or as circuitry comprised within the processor, within a graphics chip or other integrated circuit or chip, or within a camera module. The techniques described above may be implemented in the image chip of the processor or functions may be distributed between different components which may include the cameras, image chip, processor, and other components.

The communication package 46 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 46 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 46. For instance, a first communication package 46 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

In various implementations, the computing device 100 may be a laptop, a netbook, a notebook, an ultrabook, a smartphone, a wearable device, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. The computing device may be fixed, portable, or wearable. In further implementations, the computing device 100 may be any other electronic device that processes data.

The camera array 32 may be of the type described in reference to FIGS. 1 and 2 or another suitable configuration. The camera array may be incorporated into the same housing as the rest of the computing device 100 or it may be a separate peripheral device attached through a suitable wired or wireless connector. The computing device may be used a server device, editing device, or client device in a fixed or portable configuration.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims. The various features of the different embodiments may be variously combined with some features included and others excluded to suit a variety of different applications.

Some embodiments pertain to a method that includes receiving encoded video including rotation orientation metadata, decoding the video, extracting the rotation orientation metadata, rotating the decoded video based on the rotation orientation metadata, generating a view of the rotated decoded video, and buffering the generated view for display.

In further embodiments the received encoded video is a planar projection of a wide field of view.

In further embodiments the planar projection is an equi-rectangular projection and the wide field of view is panoramic.

In further embodiments the metadata is encoded as a Supplemental Enhancement Information message.

In further embodiments the metadata includes at least one of a pitch, yaw and roll to be applied in rotating the decoded video.

In further embodiments the metadata includes rotation information for a relative orientation of the video and for an absolute orientation of the video.

In further embodiments the relative orientation is relative to the absolute orientation and the absolute orientation reflects an orientation of a camera.

In further embodiments the metadata is associated with a frame of the received encoded video, the method comprising receiving additional metadata for additional frames of the encoded video.

In further embodiments the metadata includes a spherical rotation persistence flag indicating that the received spherical rotation does not apply to the additional frames.

Further embodiments include generating a view of the rotated decoded video for presentation on a display.

Some embodiments pertain to a machine-readable medium having instructions stored thereon that when executed cause the machine to perform operations that include receiving encoded video including rotation orientation metadata, decoding the video, extracting the rotation orientation metadata, rotating the decoded video based on the rotation orientation metadata, generating a view of the rotated decoded video, and buffering the generated view for display.

In further embodiments the planar projection is a cube map projection and the wide field of view is panoramic Some embodiments pertain to an apparatus that includes a video decoder to receive encoded video including rotation orientation metadata, to decode the video, and to extract the rotation orientation metadata, a spherical rotator to rotate the decoded video based on the rotation orientation metadata, and a viewport generator to generate a view of the rotated decoded video and to buffer the generated view for display Further embodiments include a head mounted display to receive viewport selections from the user and to display the generated view, wherein the viewport generator uses the received viewport selections to generate the view.

Some embodiments pertain to a method that includes receiving a wide field of view video at a buffer, selecting a rotation of a planar projection, rotating the wide field of view video, generating rotation orientation metadata describing the selected rotation, mapping the rotated video into the planar projection in a projection mapping module to form a rotated projection, encoding the rotated projection as encoded video including the rotation orientation metadata in a video encoder, and buffering the encoded video for display In further embodiments the received wide field of view video is received from multiple cameras, the method further comprising stitching the video from multiple cameras together to produce a single wide field of view video.

In further embodiments mapping the video comprises mapping the video to an equi-rectangular projection and wherein the wide field of view is panoramic.

In further embodiments the metadata is encoded as a Supplemental Enhancement Information message.

In further embodiments the metadata includes at least one of pitch, yaw, and roll to be applied in rotating the encoded video when decoding the video.

In further embodiments the metadata includes rotation information for a relative orientation of the video and for an absolute orientation of the video.

In further embodiments the relative orientation is relative to the absolute orientation and the absolute orientation reflects an orientation of a camera.

Further embodiments include receiving a viewport for the wide field of view video, and comparing the viewport to the edges of the planar projection, wherein selecting a rotation comprises selecting a rotation to move the viewport away from an edge of the planar projection.

In further embodiments comparing the viewport comprises comparing the edges of the viewport to the edges of the planar projection and wherein selecting a rotation comprises selecting a rotation to move the edges of the viewport at least a predetermined distance from the edges of the planar projection.

In further embodiments selecting a rotation comprises determining a high motion area of the video and selecting a rotation to place the high motion area at a center of the planar projection.

In further embodiments selecting a rotation comprises encoding video for a planar projection of rotated projections with different rotation values, comparing bitrates for the encoded videos and selecting the rotation value corresponding to the encoded video with the lowest bit rate.

Some embodiments pertain to a machine-readable medium having instructions stored thereon that when executed cause the machine to perform operations that include receiving a wide field of view video, selecting a rotation of a planar projection, rotating the wide field of view video using the selected rotation, generating rotation orientation metadata describing the selected rotation, mapping the rotated video into the planar projection to form a rotated projection, encoding the rotated projection as encoded video including the rotation orientation metadata in a video encoder, and buffering the encoded video for display.

In further embodiments selecting a rotation comprises determining a high motion area of the video and selecting a rotation to place the high motion area at a center of the planar projection.

Some embodiments pertain to an apparatus that includes a video stitcher to generate a wide field of view video and store the video in a buffer, a rotation selector to select a rotation of a planar projection of the stored video and to generate rotation orientation metadata describing the selected rotation, a spherical rotator to rotate the wide field of view video, a projection mapper to map the rotated video into the planar projection to form a rotated projection, a video encoder to encode the rotated projection as encoded video including the rotation orientation metadata in a video encoder, and a buffer to store the encoded video for display.

The invention claimed is:

1. An encoder comprising:
first circuitry to:
generate a sphere rotation supplemental enhancement information message associated with a video, the sphere rotation supplemental enhancement information message includes information on rotation angles yaw ($\alpha$), pitch ($\beta$), and roll ($\gamma$) that are used for conversion between global coordinate axes and local coordinate axes, wherein roll corresponds to a rotation around an x-axis, pitch corresponds to a rotation around a y-axis, and yaw corresponds to a rotation around a z-axis, the sphere rotation supplemental enhancement information message includes:
sphere_rotation_cancel_flag, wherein the sphere_rotation_cancel_flag equals to 1 indicates that the sphere rotation supplemental enhancement information message cancels persistence of any previous sphere rotation supplemental enhancement information message;
sphere_rotation_persistence_flag, the sphere_rotation_persistence_flag specifies persistence of the sphere rotation supplemental enhancement information message for a current layer, wherein the sphere_rotation_persistence_flag equals to 0 specifies that the sphere rotation supplemental enhancement information message applies to a current decoded picture only, wherein the sphere_rotation_persistence_flag equals to 1 specifies that the sphere rotation supplemental enhancement information message applies persists for the current layer until one or more conditions are met, and
at least one of:
yaw_rotation, wherein yaw_rotation specifies the value of the yaw rotation angle, wherein a 0 for yaw_rotation indicates that there is no yaw rotation,
pitch rotation, wherein pitch rotation specifies the value of the pitch rotation angle, wherein a 0 indicates that there is no pitch rotation, or
roll_rotation, wherein roll_rotation specifies the value of the roll_rotation angle, wherein a 0 for roll rotation indicates that there is no roll rotation; and
second circuitry to output the sphere rotation supplemental enhancement information message.

2. The encoder of claim 1, wherein the sphere_rotation_cancel_flag equals to 0 indicates that sphere rotation information follows.

3. The encoder of claim 1, wherein the one or more conditions include: a new coded layer video sequence (CLVS) of the current layer begins, a bitstream ends, or a picture in the current layer associated with a subsequent sphere rotation supplemental enhancement information message is output that follows a current picture in output order.

4. The encoder of claim 1, wherein at least one of the yaw_rotation, the pitch_rotation, or the roll_rotation is in units of $2^{-16}$ degrees.

5. The encoder of claim 1, wherein at least one of the value of the yaw_rotation is equal to zero when the value of the yaw_rotation is not present, the value of the pitch_rotation is equal to zero when the value of the pitch_rotation is not present, or the value of the roll_rotation is equal to zero when the value of the roll_rotation is not present.

6. The encoder of claim 1, wherein the second circuitry is to transmit the sphere rotation supplemental enhancement information message.

7. The encoder of claim 1, wherein the second circuitry is to store the sphere rotation supplemental enhancement information message.

8. A system comprising:
memory;
at least one sensor;
a display;
a storage device;
communication circuitry; and
at least one processor to:
generate a sphere rotation supplemental enhancement information message associated with a video, the sphere rotation supplemental enhancement information message includes information on rotation angles yaw ($\alpha$), pitch ($\beta$), and roll ($\gamma$) that are used for conversion between global coordinate axes and local coordinate axes, wherein roll corresponds to a rotation around an x-axis, pitch corresponds to a rotation around a y-axis, and yaw corresponds to a rotation around a z-axis, the sphere rotation supplemental enhancement information message includes:
sphere_rotation_cancel_flag, wherein the sphere_rotation_cancel_flag equals to 1 indicates that the sphere rotation supplemental enhancement information message cancels persistence of any previous sphere rotation supplemental enhancement information message;

sphere_rotation_persistence_flag, the sphere_rotation_persistence_flag specifies persistence of the sphere rotation supplemental enhancement information message for a current layer, wherein the sphere_rotation_persistence_flag equals to 0 to specifies that the sphere rotation supplemental enhancement information message applies to a current decoded picture only, wherein the sphere_rotation_persistence_flag equals to 1 specifies that the sphere rotation supplemental enhancement information message applies persists for the current layer until one or more conditions are met, and at least one of:
yaw_rotation, wherein yaw_rotation specifies the value of the yaw rotation angle, wherein a 0 for yaw_rotation indicates that there is no yaw rotation, pitch rotation, wherein pitch rotation specifies the value of the pitch rotation angle, wherein a 0 indicates that there is no pitch rotation, or roll_rotation, wherein roll_rotation specifies the value of the roll rotation angle, wherein a 0 for roll_rotation indicates that there is no roll rotation.

9. The system of claim 8, wherein the sphere_rotation_cancel_flag equals to 0 indicates that sphere rotation information follows.

10. The system of claim 8, wherein the one or more conditions include: a new coded layer video sequence (CLVS) of the current layer begins, a bitstream ends, or a picture in the current layer associated with a subsequent sphere rotation supplemental enhancement information message is output that follows a current picture in output order.

11. The system of claim 8, wherein at least one of the yaw_rotation, the pitch_rotation, or the roll_rotation is in units of $2^{-16}$ degrees.

12. The system of claim 8, wherein at least one of the value of the yaw_rotation is equal to zero when the value of the yaw_rotation is not present, the value of the pitch_rotation is equal to zero when the value of the pitch_rotation is not present, or the value of the roll_rotation is equal to zero when the value of the roll_rotation is not present.

13. The system of claim 8, wherein the at least one processor is to cause output of the sphere rotation supplemental enhancement information message includes transmitting the sphere rotation supplemental enhancement information message.

14. The system of claim 8, wherein the at least one processor is to cause the sphere rotation supplemental enhancement information message to be stored.

15. The system of claim 8, further including a camera.

16. The system of claim 8, further including a battery.

17. An encoder comprising:
first means for generating a sphere rotation supplemental enhancement information message associated with a video, the sphere rotation supplemental enhancement information message includes information on rotation angles yaw (α), pitch (β), and roll (γ) that are used for conversion between global coordinate axes and local coordinate axes, wherein roll corresponds to a rotation around an x-axis, pitch corresponds to a rotation around a y-axis, and yaw corresponds to a rotation around a z-axis, the sphere rotation supplemental enhancement information message includes:

sphere_rotation_cancel_flag, wherein the sphere_rotation_cancel_flag equals to 1 indicates that the sphere rotation supplemental enhancement information message cancels persistence of any previous sphere rotation supplemental enhancement information message;

sphere_rotation_persistence_flag, the sphere_rotation_persistence_flag specifies persistence of the sphere rotation supplemental enhancement information message for a current layer, wherein the sphere_rotation_persistence_flag equals to 0 to specifies that the sphere rotation supplemental enhancement information message applies to a current decoded picture only, wherein the sphere_rotation_persistence_flag equals to 1 specifies that the sphere rotation supplemental enhancement information message applies persists for the current layer until one or more conditions are met, and at least one of:
yaw_rotation, wherein yaw_rotation specifies the value of the yaw rotation angle, wherein a 0 for yaw_rotation indicates that there is no yaw rotation, pitch_rotation, wherein pitch_rotation specifies the value of the pitch rotation angle, wherein a 0 indicates that there is no pitch rotation, or roll_rotation, wherein roll rotation specifies the value of the roll rotation angle, wherein a 0 for roll_rotation indicates that there is no roll rotation; and second means for outputting the sphere rotation supplemental enhancement information message.

18. The encoder of claim 17, wherein the sphere_rotation_cancel_flag equals to 0 indicates that sphere rotation information follows.

19. The encoder of claim 17, wherein the one or more conditions include: a new coded layer video sequence (CLVS) of the current layer begins, a bitstream ends, or a picture in the current layer associated with a subsequent sphere rotation supplemental enhancement information message is output that follows a current picture in output order.

20. The encoder of claim 17, wherein at least one of the yaw_rotation, the pitch_rotation, and the roll_rotation is in units of $2^{-16}$ degrees.

21. The encoder of claim 17, wherein at least one of the value of the yaw_rotation is equal to zero when the value of the yaw_rotation is not present, the value of the pitch_rotation is equal to zero when the value of the pitch_rotation is not present, or the value of the roll_rotation is equal to zero when the value of the roll_rotation is not present.

22. The encoder of claim 17, wherein the second means is to transmit the sphere rotation supplemental enhancement information message.

23. The encoder of claim 17, wherein the second means is to store the sphere rotation supplemental enhancement information message.

* * * * *